United States Patent
Neff et al.

(10) Patent No.: US 8,453,678 B2
(45) Date of Patent: Jun. 4, 2013

(54) PILOTED POPPET VALVE

(75) Inventors: Robert H. Neff, Bloomfield Village, MI (US); Jeffrey Simmonds, Brighton, MI (US)

(73) Assignee: MAC Valves, Inc., Wixom, MI (US)

( * ) Notice: Subject to any disclaimer, the term of this patent is extended or adjusted under 35 U.S.C. 154(b) by 808 days.

(21) Appl. No.: 12/416,495

(22) Filed: Apr. 1, 2009

(65) Prior Publication Data
US 2010/0252132 A1    Oct. 7, 2010

(51) Int. Cl.
*F15B 13/043* (2006.01)

(52) U.S. Cl.
USPC ............ 137/625.64; 137/625.6; 137/625.27; 137/625.67; 137/625.69; 137/625.63; 251/31; 251/359; 251/360

(58) Field of Classification Search
USPC ............ 137/625.64, 625.6, 625.27, 625.67, 137/625.69, 625.63; 251/31, 359, 360
See application file for complete search history.

(56) References Cited

U.S. PATENT DOCUMENTS

| | | | |
|---|---|---|---|
| 2,981,287 A * | 4/1961 | Caslow | 137/625.63 |
| 3,016,917 A * | 1/1962 | Hunt | 137/625.27 |
| 3,202,182 A | 8/1965 | Haviland | |
| 3,244,193 A | 4/1966 | Loveless | |
| 3,260,273 A * | 7/1966 | Hayner | 137/85 |
| 3,384,122 A * | 5/1968 | Harpman | 137/625.64 |
| 3,510,103 A | 5/1970 | Carsello | |
| 3,527,253 A * | 9/1970 | Harpman | 137/625.27 |
| 3,538,954 A | 11/1970 | Fagerlie et al. | |
| 3,599,672 A * | 8/1971 | Baghuis | 137/625.48 |
| 3,680,593 A * | 8/1972 | Sorenson | 137/625.48 |
| 3,762,443 A | 10/1973 | Sorenson | |
| 3,884,266 A * | 5/1975 | Kondo | 137/625.27 |
| 4,067,357 A * | 1/1978 | Ruchser | 137/596.16 |
| 4,266,572 A * | 5/1981 | Schuttenberg et al. | 137/625.63 |
| 4,298,027 A | 11/1981 | Neff | |
| 4,407,323 A | 10/1983 | Neff | |
| 4,438,418 A | 3/1984 | Neff | |
| 4,485,846 A | 12/1984 | Neff | |
| 4,513,783 A * | 4/1985 | Inoue | 137/625.68 |
| 4,543,875 A * | 10/1985 | Imhof | 91/459 |
| 4,574,844 A | 3/1986 | Neff et al. | |
| 4,610,424 A | 9/1986 | Koppers et al. | |
| 4,621,656 A * | 11/1986 | Ichimaru | 137/625.66 |
| 4,664,135 A * | 5/1987 | Hayner | 137/82 |

(Continued)

OTHER PUBLICATIONS

Republic of China .(Taiwan) Intellectual Property Office (IPO) Examination Report for Republic of China (Taiwan) Patent Application No. 099108746 with Translation of Office Action and Search Report, dated Nov. 28, 2012, 10 pages.

*Primary Examiner* — John Rivell
*Assistant Examiner* — Minh Le
(74) *Attorney, Agent, or Firm* — Harness, Dickey & Pierce, P.L.C.

(57) ABSTRACT

A valve assembly includes a valve body having a valve bore. A valve member is slidably disposed within the valve bore between first and second stop positions. First and second valve elements of the valve member have first and second sealing surfaces equally angled with respect to a valve member longitudinal axis. Each of the first and second sealing surfaces is oriented parallel with conical shaped first and second seat surfaces. Both first and second seat surfaces are equally angled with respect to the longitudinal axis and have an adjustable spacing such that the first sealing surface contacts the first seat surface and the second sealing surface contacts the second seat surface simultaneously in the first stop position.

15 Claims, 6 Drawing Sheets

U.S. PATENT DOCUMENTS

| | | | |
|---|---|---|---|
| 4,726,393 A * | 2/1988 | Herner | 137/269 |
| 4,726,398 A | 2/1988 | Barree | |
| 4,823,840 A * | 4/1989 | Kosugi et al. | 137/625.27 |
| 4,842,246 A | 6/1989 | Floren et al. | |
| 4,880,033 A | 11/1989 | Neff | |
| 5,092,365 A | 3/1992 | Neff | |
| 5,103,866 A | 4/1992 | Foster | |
| 5,136,774 A | 8/1992 | Neff | |
| 5,211,198 A | 5/1993 | Tinholt | |
| 5,248,123 A * | 9/1993 | Richeson et al. | 251/29 |
| 5,623,967 A * | 4/1997 | Hayashi | 137/625.64 |
| 5,848,612 A * | 12/1998 | Currey | 137/625.63 |
| 6,167,901 B1 * | 1/2001 | Yoshinura | 137/269 |
| 6,192,937 B1 | 2/2001 | Faagerlie et al. | |
| 6,213,447 B1 * | 4/2001 | Bircann et al. | 251/86 |
| 6,230,742 B1 | 5/2001 | Bircann | |
| 6,668,861 B2 | 12/2003 | Williams | |
| 6,871,668 B2 * | 3/2005 | Moreno et al. | 137/625.27 |
| 7,210,501 B2 * | 5/2007 | Neff et al. | 137/625.65 |
| 7,735,518 B2 * | 6/2010 | Williams et al. | 137/625.63 |
| 8,151,824 B2 * | 4/2012 | Williams et al. | 137/625.69 |

* cited by examiner

PILOTED POPPET VALVE

FIELD

The present disclosure relates to poppet valves having a sliding valve member with multiple valve member seals.

BACKGROUND

This section provides background information related to the present disclosure which is not necessarily prior art.

Pneumatic valve assemblies are well known in the art for controlling the flow of pressurized air or liquids. One type of pneumatic valve currently employed in numerous applications in the related art is generally known as a poppet valve. Poppet valves find particular use in connection with pilot operated pneumatic valves as a part of an overall fluid powered system. One common poppet valve arrangement includes a valve member movably supported within a valve body between predetermined positions. These positions are typically defined by the placement of the seats within the valve bore. The valve member has a valve element that engages the seats.

One consideration to maintaining a consistent valve member stroke and thereby valve longevity is the nature of the seat and valve member interaction. Valve seats commonly employed in the related art typically include a square cut or 90° corner surface. The corresponding valve element usually includes a relatively conical or angularly-formed valve sealing surface. Most often, the valve element is over-molded, or encapsulated, with a resilient material to improve the sealing effect and provide a slight cushioning of the valve member as it interacts with the squared valve seat. The square cut 90° corner of the valve seat can penetrate deep into the poppet valve element during valve operation. As it penetrates, the force being applied to the valve element is spread out across the valve-sealing surface. This sealing interaction initially tends to create a good seal as the over-molded material on the sealing surface of the valve element deflects inwardly slightly as it rests against the edge of the seat thereby creating a ring seal about the seat. However, this sealing effect creates wear as the valve is repetitively activated by causing the sealing material to be repetitively deformed and ultimately damaged, for example by being cut as the valve member moves to its seated position against the square cut valve seat during each and every valve closing event.

As the sealing material begins to permanently deform and then finally cut, the actuator must make a longer and longer stroke to seal the valve. This on-going lengthening of the valve stroke introduces a dynamic change to the timing of the valve actuation, which degrades the operation being performed. Changes in valve timing actuation due to changes in the valve stroke translate into process inaccuracies and inconsistencies that ultimately require valve replacement. Secondly, the deforming and cutting of the valve sealing material may cause leakage and often introduces pieces of the sealing material into the downstream pneumatic flow path.

SUMMARY

This section provides a general summary of the disclosure, and is not a comprehensive disclosure of its full scope or all of its features.

According to several embodiments of a poppet valve of the present disclosure, a valve assembly includes a valve body having a valve bore. A valve member is slidably disposed within the valve bore between first and second stop positions. First and second radially extending valve elements connected to the valve member have first and second sealing surfaces oriented at equal angles with respect to a longitudinal axis of the valve member. Each of the first and second sealing surfaces are oriented substantially parallel with conical shaped first and second seat surfaces, both first and second seat surfaces oriented at equal angles with respect to the longitudinal axis and having an adjustable spacing such that the first sealing surface contacts the first seat surface and the second sealing surface contacts the second seat surface simultaneously in the first stop position of the valve member.

According to other embodiments, a valve assembly includes a valve body having an inlet port in fluid communication with a source of fluid, a valve bore extending axially within the valve body, and first and second outlet ports. A valve member is slidably disposed within the valve bore between first and second stop positions. First and second radially extending resilient valve elements are connected to the valve member, the first valve element having a first sealing surface and the second valve element having a second sealing surface. The first and second sealing surfaces are oriented at equal angles with respect to a longitudinal axis of the valve member. The first sealing surface is adapted to contact a conical shaped first seat surface, and the second sealing surface adapted to contact a conical shaped second seat surface. The first and second seat surfaces are oriented substantially parallel to the first and second sealing surfaces. A spacing between the first and second seat surfaces is equal to a spacing between the first and second sealing surfaces providing for simultaneous contact between the first valve element and the first seat surface and between the second valve element and the second seat surface in the first stop position.

According to further embodiments, a valve assembly includes a valve body having a valve bore. A valve member is slidably disposed within the valve bore between first and second stop positions. First and second resilient valve elements are connected to the valve member. The first valve element has a first sealing surface and the second valve element has a second sealing surface. The first and second sealing surfaces are oriented at equal angles with respect to a longitudinal axis of the valve member. The first valve element further has a third sealing surface and the second valve element further has a fourth sealing surface. The third and fourth sealing surfaces are oriented as a mirror image of the first and second sealing surfaces. Each of the first and second sealing surfaces is oriented substantially parallel with conical shaped first and second seat surfaces. Both first and second seat surfaces are oriented at equal angles with respect to the longitudinal axis and have an adjustable spacing such that the first sealing surface contacts the first seat surface and the second sealing surface contacts the second seat surface simultaneously in the first stop position of the valve member. Each of the third and fourth sealing surfaces is oriented substantially parallel with conical shaped third and fourth seat surfaces. Both third and fourth seat surfaces are oriented at equal angles with respect to the longitudinal axis such that the third sealing surface contacts the third seat surface and the fourth sealing surface contacts the fourth seat surface simultaneously in the second stop position of the valve member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
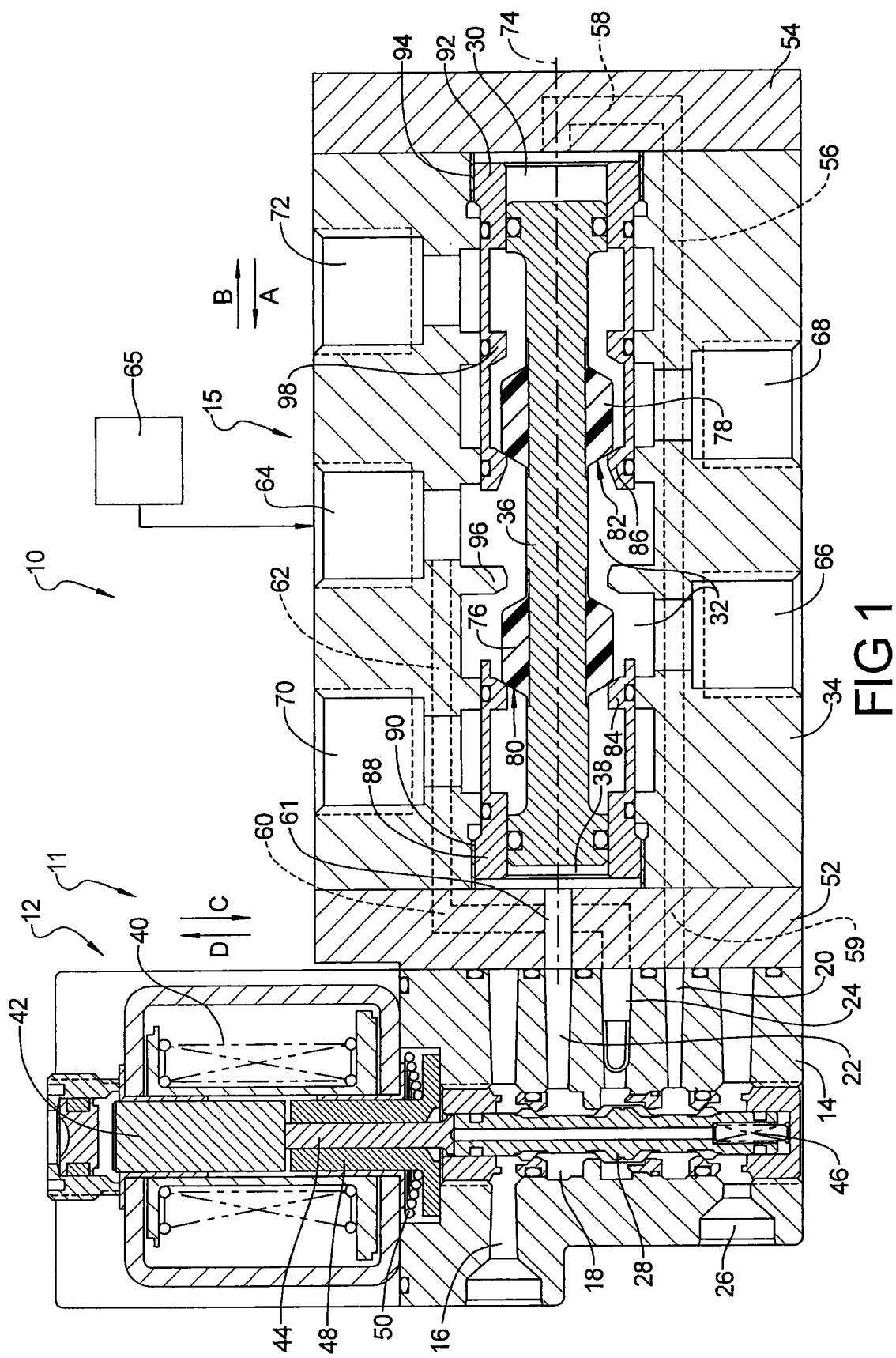
FIG. 1 is a cross sectional front elevational view of a pilot operated poppet valve of the present disclosure taken at section 1 of FIG. 5.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, a 4-way valve 10 has a solenoid pilot valve 11 having a solenoid operator 12 connected to a solenoid body 14, the solenoid pilot valve 11 solenoid body releasably connected to a valve assembly 15. The disclosure is not limited to 4-way valves and can also include 3-way and other configurations of valves. Solenoid body 14 includes a first exhaust aperture 16, an axial bore 18, a first port 20, a second port 22, a third port 24, and a second exhaust aperture 26. Third port 24 acts as in inlet to receive pressurized air in solenoid pilot valve 11. In a de-energized condition of solenoid operator 12 a solenoid member 28 which is slidably disposed in axial bore 18 is aligned to deliver pressurized air received in third port 24 through first port 20 to a first bore portion 30 of a valve bore 32 of a valve body 34, which induces a sliding motion of a valve member 36 in a valve member first displacement direction "A". Also in the de-energized condition, second port 22 is aligned with first exhaust aperture 16 to vent a second bore portion 38 to atmosphere. To translate valve member 36 in an opposite second displacement direction "B", solenoid operator 12 is energized to slidably move solenoid member 28 in a solenoid member displacement direction "C" to align third port 24 with second port 22 to direct pressurized air into second bore portion 38 forcing valve member 36 to slide in the valve member second displacement direction "B". Also when solenoid operator 12 is energized, second exhaust aperture 26 is aligned with first port 20 to vent first bore portion 30 to atmosphere.

A solenoid coil 40 can be energized to axially displace an armature 42 which contacts and translates a contact member 44 which displaces solenoid member 28 in the solenoid member displacement direction "C". When solenoid coil 40 is de-energized, spring force of a biasing member 46 returns solenoid member 28, contact member 44, and armature 42 in a return direction "D". A pole piece 48 slidably receives contact member 44 and can displace against the biasing force of a biasing member 50 to absorb displacement energy of armature 42 and/or contact member 44.

A first valve body end 52 can be used to couple valve body 34 to solenoid body 14. A second valve body end 54 is releasably connected to an opposite end of valve body 34 used during valve assembly for access and removed after valve assembly if required to access the valve member 36 in valve bore 32 to make adjustments as necessary for the timing and operation of valve 10. First port 20 is connected to a first flow passage 56 of valve body 34, a first two-way bore 58 of second valve body end 54, and a first transfer passage 59 of first valve body end 52 to direct pressurized air into or out of first bore portion 30. Third port 24 is connected to a second transfer passage 60 of first valve body end 52 and a second flow passage 62 of valve body 34 to direct pressurized air received via a fluid inlet port 64 into solenoid pilot valve 11.

Valve 10 further includes valve body 34 having fluid inlet port 64 in fluid communication with a source providing a gas or fluid such as pressurized air 65 for both solenoid pilot valve 11 and valve assembly 15, valve bore 32 extending axially within the valve body 34, and at least one outlet port. Pressurized air 65 can also be any liquid or gas adapted for operation of solenoid pilot valve 11 and valve assembly 15, such as compressed air, inert gases, and the like. The at least one outlet port can include first and second outlet ports 66, 68. First and second exhaust ports 70, 72 are also provided with valve body 34. The valve member 36 is axially slidably disposed within the valve bore 32 co-axial with a longitudinal axis 74 of valve body 34 between predetermined first and second stop positions adapted to selectively direct a flow of the pressurized air 65 from the inlet port 64 through the valve bore 32 to one of the first or second outlet ports 66 or 68.

First and second radially extending valve elements 76, 78 connected to the valve member 36 for example as overmolded resilient material elements, have first and second sealing surfaces 80, 82 oriented at equal angles with respect to the longitudinal axis 74 of the valve member 36. First and second radially extending valve elements 76, 78 are axially spaced from each other to permit both to simultaneously contact a first seat 84 and a second seat 86 extending into valve bore 32 defining the first stop position. First seat 84 integrally extends from a first adapter 88 axially positioned within valve bore 32 using a first threaded connection 90. Second seat 86 integrally extends from a second adapter 92 axially positioned within valve bore 32 using a second threaded connection 94. First and second threaded connections 90, 94 permit axial adjustment of the positions of first and second seats 84, 86. First and second radially extending valve elements 76, 78 can also contact a third seat 96 which is integrally connected to valve body 34, and a fourth seat 98 integrally extending from second adapter 92 as will be further discussed in reference to FIGS. 2 and 3.

Figure 2:
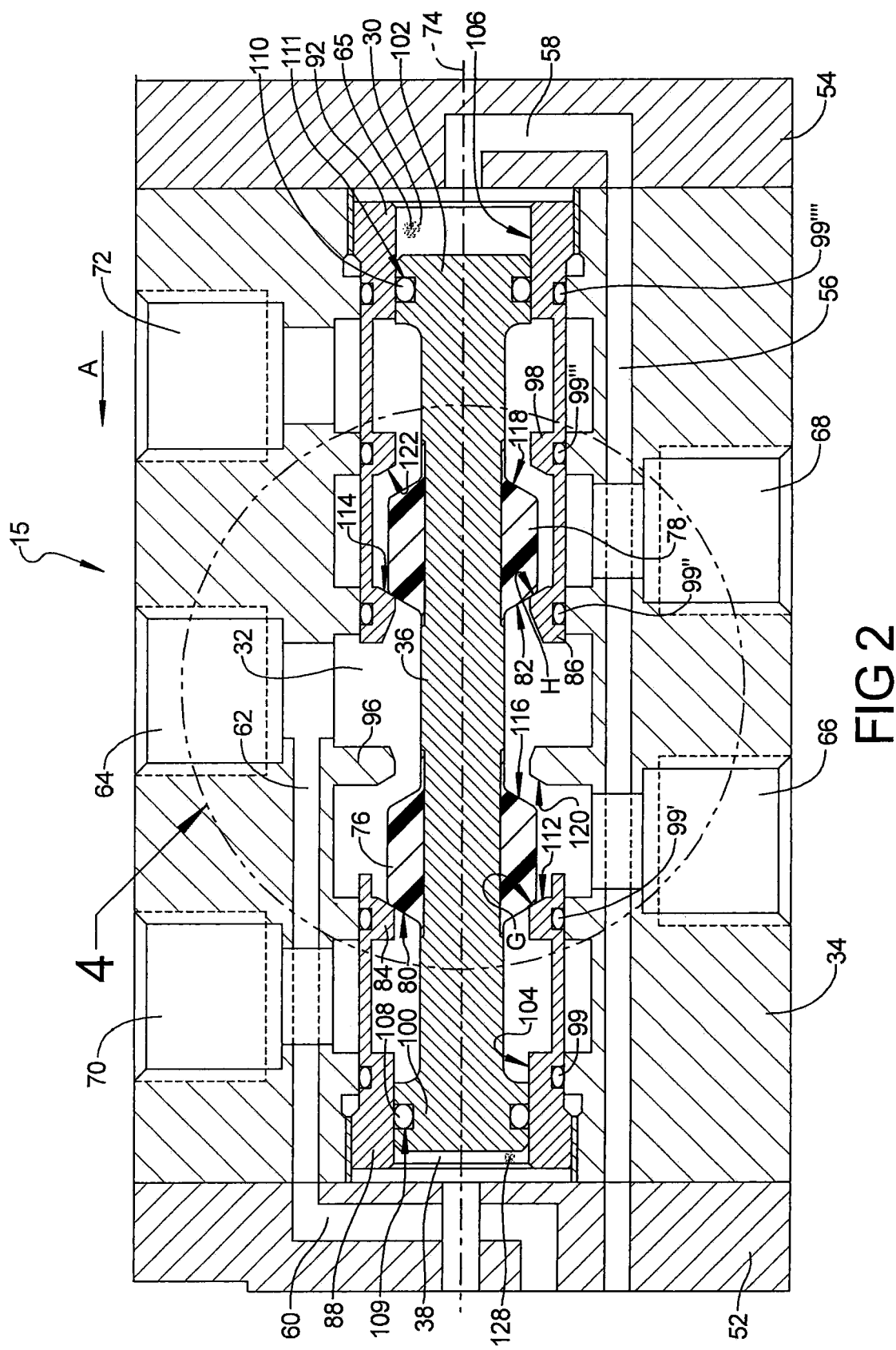
FIG. 2 is a cross sectional front elevational view of the valve assembly of FIG. 1.

Referring to FIG. 2, the first and second adapters 88, 92 are axially adjustably positioned within the valve bore 32 between the valve member 36 and the valve body 34 and are adapted to slidably receive the valve member 36. At least one of and according to several embodiments both first and second adapters 88, 92 are axially movable to axially adjust a position of first seat 84 with respect to second seat 86, or to axially adjust a position of fourth seat 98 with respect to the fixed position third seat 96. Each of the first and second adapters 88, 92 can include one or more seal members 99 positioned between an outer perimeter of the first and second adapters 88, 92 and inner walls of the valve body 34. According to several embodiments, seal members 99, 99' are provided with first adapter 88, and seal members 99", 99"', and 99"" are provided with second adapter 92. Seal members 99 can be O-rings or gaskets, adapted to create a fluid boundary between pressurized air 65 in first and second bore portions 30, 38 and valve bore 32.

Valve assembly 15 includes first and second valve body ends 52, 54 releasably connected to valve body 34, for example using fasteners (not shown). First and second pistons 100, 102 can be created at opposite ends of valve member 36. To minimize sliding friction of valve member 36, sliding contact is only made between first and second pistons 100, 102 and each of a first and second cylinder wall 104, 106 created in first and second adapters 88, 92. To further minimize sliding friction of valve member 36, each of the first and second pistons 100, 102 have only a single bore seal, designated as first and second bore seals 108, 110 positioned in slots 109, 111 circumferentially created about each of the first and second pistons 100, 102. First and second bore seals 108, 110 are each adapted to create a sliding seal with first and second cylinder walls 104, 106. According to several embodiments, first and second bore seals 108, 110 can be O-rings or D-rings, however, other types of seals can be used such as gaskets or diaphragms. First and second bore seals 108, 110 slidingly contact first and second cylinder walls 104, 106 to provide a pressure boundary for the pressurized air 65 received in first or second bore portions 30, 38 so pressurized air 65 can enter one of the first or second bore seals 108, 110 and valve bore 32 while being allowed to vent from the other one of the first or second bore seals 30, 38, allowing forced displacement of valve member 36.

The first and second sealing surfaces 80, 82 of first and second valve elements 76, 78 are adapted to contact first and second seating surfaces 112, 114 of the first and second seats 84, 86. Similarly, first and second valve elements 76, 78 also include third and fourth sealing surfaces 116, 118 adapted to contact conical shaped third and fourth seating surfaces 120, 122 of third and fourth seats 96, 98. First and second seating surfaces 112, 114 are oriented substantially parallel to the first and second sealing surfaces 80, 82 of the first and second valve elements 76, 78 such that the first sealing surface 80 of first valve element 76 contacts the first seating surface 112 of first seat 84, and the second sealing surface 82 of second valve element 78 contacts the second seating surface 114 of second seat 86 simultaneously. For the same reason, third and fourth seating surfaces 116, 118 are oriented substantially parallel to the third and fourth sealing surfaces 120, 122 of the third and fourth seats 96, 98 such that the third sealing surface 116 of first valve element 76 contacts the third seating surface 120 of third seat 96, and the fourth sealing surface 118 of second valve element 78 contacts the fourth seating surface 122 of fourth seat 98 simultaneously defining the second stop position.

According to several embodiments, a surface area of the first valve element 76 in contact with the first seating surface 112 is substantially equal to a surface area of the second valve element 78 in contact with the second seating surface 114 in the first stop position. Similarly, a surface area of the first valve element 76 in contact with the third seating surface 120 is substantially equal to a surface area of the second valve element 78 in contact with the fourth seating surface 122 in the second stop position. Maintaining equal surface areas of contact maintains a substantially equal force applied by the first valve element 76 and the second valve element 78 to their respective seating surfaces. Maintaining a substantially equal force of valve element contact provides several advantages including equalizing seal effectiveness and equalizing wear between the valve elements and their seating surfaces so that linear displacement of valve member 36 between seating positions does not substantially change over time and alter the output of valve 10.

Referring to both FIGS. 1 and 2, to position valve member 36 in the first stop position, valve member 36 is translated to the left as shown in FIGS. 1 and 2 in the valve member first displacement direction "A". To translate valve member 36 in the valve member first displacement direction "A" solenoid coil 40 is de-energized allowing a biasing force of biasing member 46 to displace solenoid member 28, contact member 44, and armature 42 in the solenoid member return direction "D". This displacement of solenoid member 28 permits pressurized air 65 to flow into solenoid pilot valve 11 from inlet port 64 through second flow passage 62 and third port 24, and out through each of first port 20, first transfer passage 59 of first valve body end 52, first flow passage 56, first two-way bore 58 and into first bore portion 30. At the same time, second port 22 is aligned with first exhaust aperture 16 to vent a volume of residual air 128 from second bore portion 38 through a third transfer passage 61 of first body end 52, and through second port 22 to atmosphere via first exhaust aperture 16. Valve member 36 axially translates with respect to longitudinal axis 74 in the valve member first displacement direction "A" until first valve element 76 contacts first seat 84 and simultaneously second valve element 78 contacts second seat 86 at the first stop position.

Referring to FIG. 3 and again to FIG. 1, valve assembly 15 is shown with valve member 36 in the second stop position, translated to the right as shown in FIG. 3 in the valve member second displacement direction "B". To translate valve member 36 in the valve member second displacement direction "B" solenoid coil 40 is energized displacing armature 42 in the solenoid member displacement direction "C". This displacement pushes contact member 44 and solenoid member 28 downwardly as viewed in FIG. 3 in the solenoid member displacement direction "C" which permits pressurized air 65 to flow through second port 22, third transfer passage 61 of first valve body end 52, and into second bore portion 38. Simultaneously, first port 20 is aligned with second exhaust aperture 26 to vent residual air 128 from first bore portion 30 through first two-way bore 58, first flow passage 56, first transfer passage 59 of first valve body end 52, and through first port 20 to atmosphere via second exhaust aperture 26. Solenoid pilot valve 11 and first valve body end 52 can also be connected to an opposite end of valve body 34 (in place of second valve body end 54) thereby reversing the first and second stop positions.

Pressurized air 65 in contact with first piston 100 forces valve member 36 to displace in the valve member second displacement direction "B" until third sealing surface 116 of first valve element 76 contacts third seating surface 120 of third seat 96 while, simultaneously, fourth sealing surface 118 of second valve element 78 contacts fourth seating surface 122 of fourth seat 98 at the second stop position. In the second stop position of valve assembly 15, pressurized air 65 flows through inlet port 64, into valve bore 32, and discharges from second outlet port 68. Also in the second stop position, first outlet port 66 is aligned through a first portion 124 of valve bore 32 with first exhaust port 70 to vent first portion 124 and first outlet port 66 to atmosphere. In addition, second exhaust port 72 vents a second portion 126 of valve bore 32 proximate to second piston 102 to atmosphere.

Figure 4:
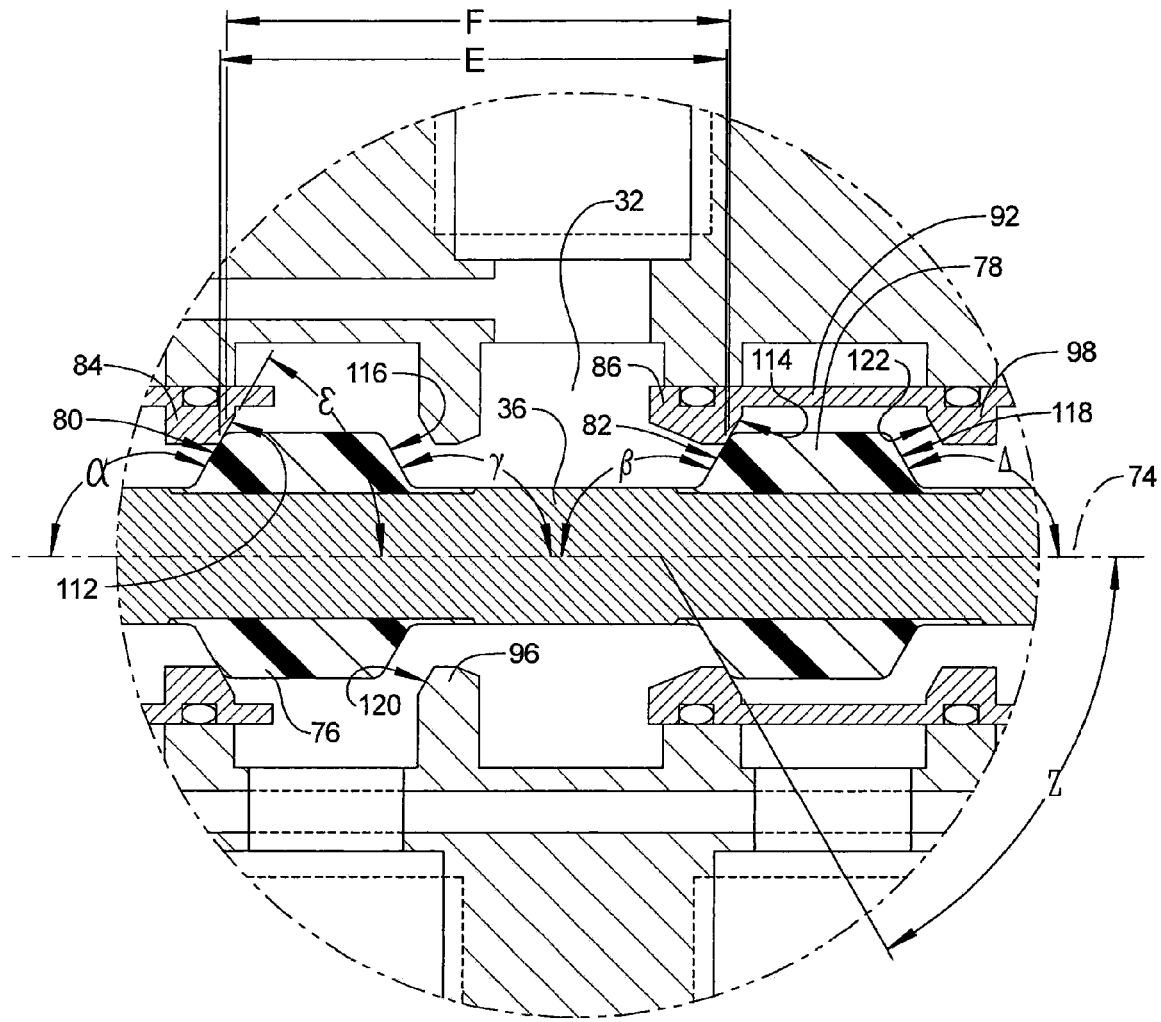
FIG. 4 is a cross sectional front elevational view of Area 4 of FIG. 2.

Referring to FIG. 4, according to several embodiments, first sealing surface 80 defines an angle $\alpha$ with respect to longitudinal axis 74, and second sealing surface 82 defines an angle $\beta$ with respect to longitudinal axis 74. Angles $\alpha$ and $\beta$ are substantially equal angles with respect to longitudinal axis 74 such that first and second sealing surfaces 80, 82 are oriented substantially parallel to each other. First and second seats 84, 86 have a seat spacing "E" from each other equal to an element spacing "F" of equivalent features (such as the left hand corners shown) of the first and second valve elements 76, 78. As previously noted herein, seat spacing "E" is adjustable to be maintained equal to element spacing "F" such that the first valve element 76 contacts the first seat 84 simultaneously with the second valve element 78 contacting the second seat 86. The first and second seating surfaces 112, 114 of first and second seats 84, 86 are oriented substantially parallel to the first and second sealing surfaces 80, 82 of the first and second valve elements 76, 78.

The third and fourth sealing surfaces 116, 118 define mirror image orientations with respect to the first and second sealing surfaces 80, 82. The third and fourth sealing surfaces 116, 118 are oriented substantially parallel to each other and are oriented at substantially equal angles $\gamma$, $\Delta$ with respect to the longitudinal axis 74 of valve member 36. Angles $\gamma$ and $\Delta$ are substantially equal angles to orient first and second sealing surfaces 80, 82 parallel to each other.

First seating surface 112 defines an angle $\epsilon$ with respect to longitudinal axis 74 and second seating surface 114 defines an angle Z with respect to longitudinal axis 74. According to several embodiments, angles $\epsilon$ and Z are substantially equal to angles $\alpha$ and $\beta$ to orient first seating surface 112 parallel with first sealing surface 80 and second seating surface 114 parallel with second sealing surface 82. Third seating surface 120 and fourth seating surface 122 are also similarly oriented parallel with respect to third and fourth sealing surfaces 116, 118. The angular configuration of the seating and sealing surfaces of the present disclosure is similar to those shown in U.S. Pat. No. 6,668,861 to Williams, co-owned by the Assignee of the present invention, the subject matter of which is incorporated herein by reference.

Figure 3:
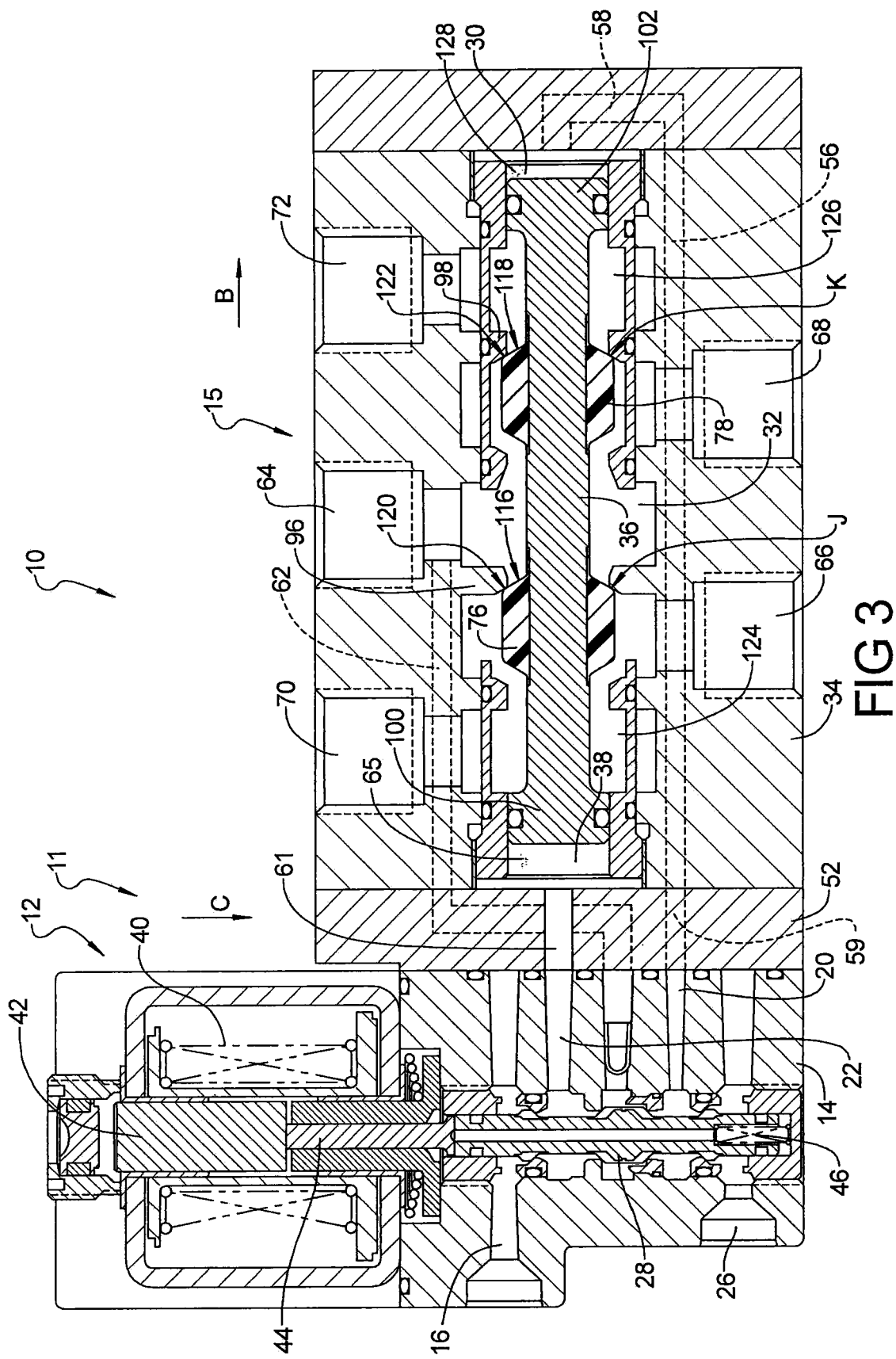
FIG. 3 is a cross sectional front elevational view similar to FIG. 1, modified to show a valve member second stop position.

Referring again to FIGS. 1 and 3, the first and second valve elements 76, 78 can be formed or machined and can also be over-moldings of an elastically flexible resilient material such as rubber or a synthetic material, over-molded to a metal material of valve member 36. The valve member 36 is slidably disposed within the valve bore 32 between predetermined first and second stop positions and movable in each of the valve member first and second displacement directions "A" and "B". The first stop position shown in FIG. 1 is adapted to permit flow of pressurized air 65 from the inlet port 64 through the valve bore 32 to the first outlet port 66. The second stop position shown in FIG. 3 is adapted to permit flow of pressurized air 65 from the inlet port 64 through the valve bore 32 to the second outlet port 68.

Referring again to FIGS. 2 and 3, a first perimeter contact surface area "G" of first sealing surface 80 in contact with first seating surface 112 is substantially equal to a second perimeter contact surface area "H" of second sealing surface 82 in contact with second seating surface 114 to equalize a seating force of both first and second valve elements 76, 78 and to equalize wear of first and second valve elements 76, 78. For the same reasons, a third perimeter contact surface area "J" of third sealing surface 116 in contact with third seating surface 120 is substantially equal to a fourth perimeter contact surface area "K" of fourth sealing surface 118 in contact with fourth seating surface 122. Because first, second, third, and fourth seats 84, 86, 96, 98 are circular in shape, the contact surface areas "G", "H", "J", and "K" define circular and conical shaped portions of the seats when contacted by the sealing surfaces of first and second valve elements 76, 78.

Figure 5:
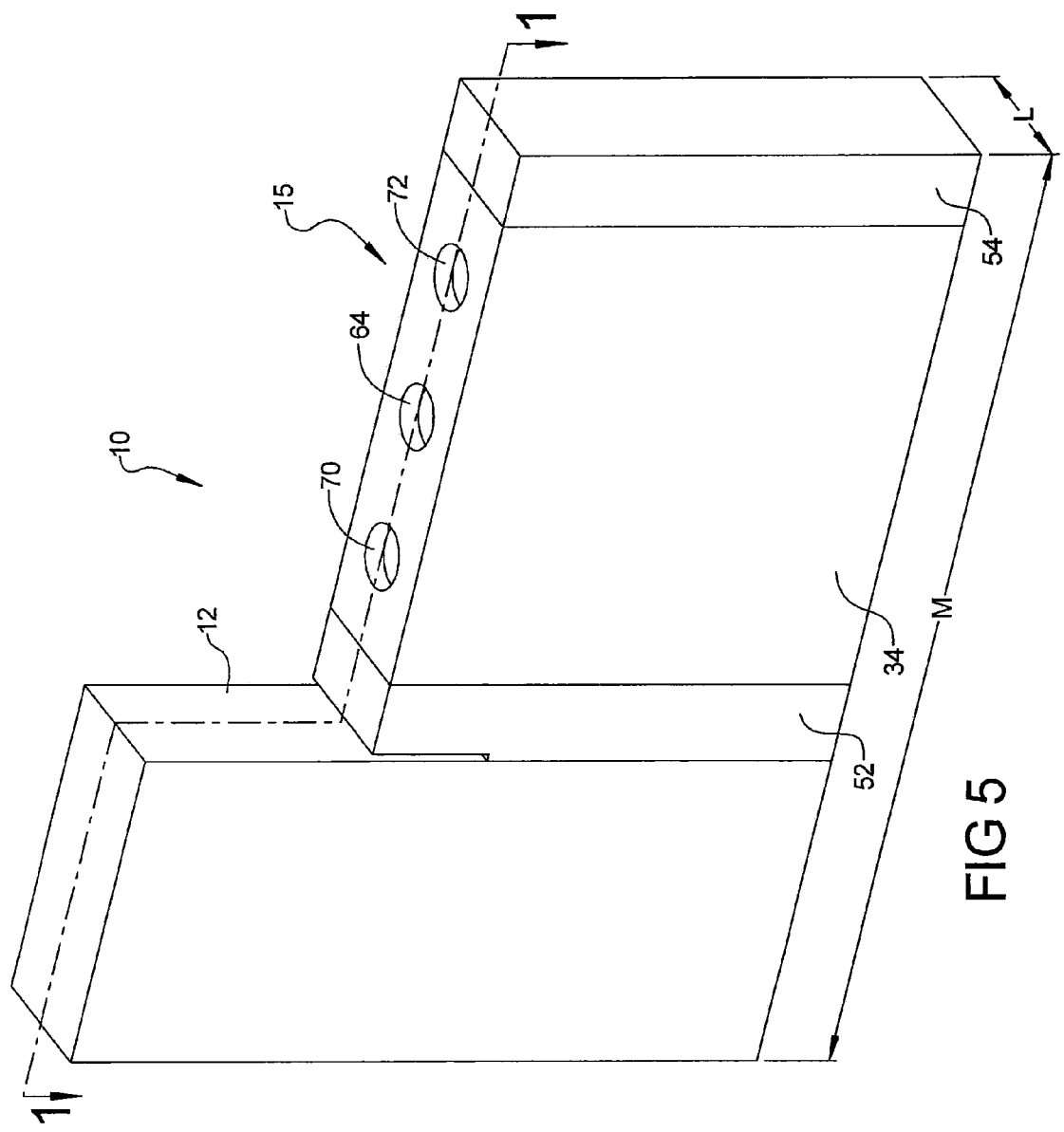
FIG. 5 is a front left perspective view of the pilot operated poppet valve of the present disclosure.

Referring to FIG. 5, a width "L" can be maintained for each of the solenoid pilot valve 11, valve body 34, first valve body end 52, and second valve body end 54. Width "L" of valve 10 can be less than a length "M" to allow multiple valve assemblies 10 to be stacked or positioned in side-by-side configuration allowing fit-up dimensional clearance for piping or tubing connections to the valve ports (only inlet port 64 and first and second exhaust ports 70, 72 are shown).

As used herein, the terms "parallel to", "parallel with", "substantially parallel", "substantially equally angled", "substantially equal angles" and the like include manufacturing tolerance variations up to plus or minus 1.5 degrees inclusive. For example and referring to FIG. 80, 82 are substantially parallel to each other within plus or minus 1.5°, and angles α and β are substantially equal angles within plus or minus 1.5°.

Figure 6:
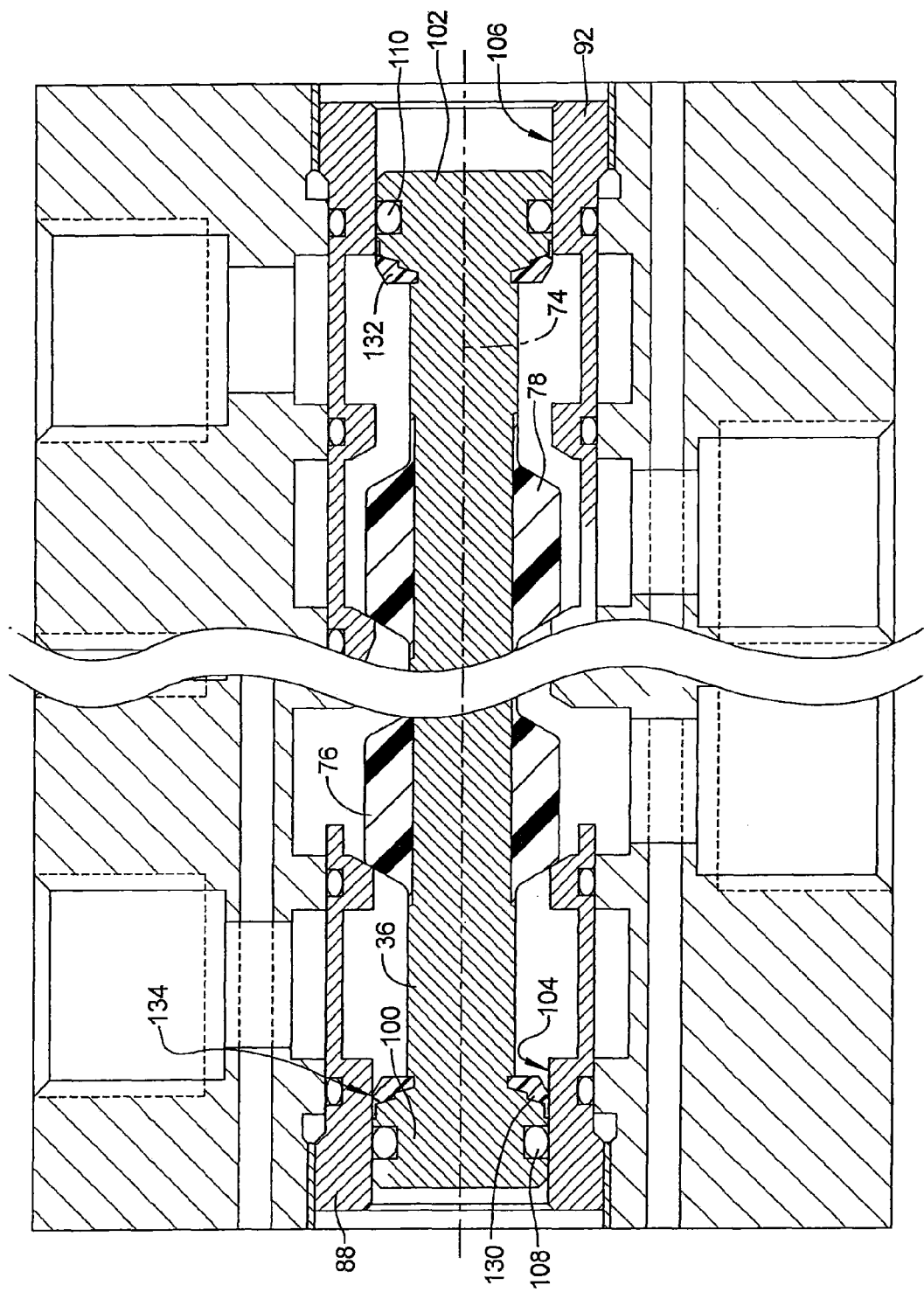
FIG. 6 is a cross sectional front elevational view of a valve assembly modified from FIG. 2 to further include overmolded centering seals.

Referring to FIG. 6, to reduce wear of first and second bore seals 108, 110, a first centering seal 130 can be over-molded from a resilient material on first piston 100 proximate to first bore seal 108, and a second centering seal 132 can be over-molded from a resilient material on second piston 102 proximate to second bore seal 110. First and second centering seals 130, 132 each include a raised or conical tipped perimeter portion 134. The perimeter portion 134 of first centering seal 130 contacts first cylinder wall 104 to center first piston 100 with respect to longitudinal axis 74, and the perimeter portion 134 of second centering seal 132 contacts second cylinder wall 106 to center second piston 102 with respect to longitudinal axis 74. Use of a harder material for first and second centering seals 130, 132 than the material of first and second bore seals 108, 110 can reduce the deflection and therefore the wear of first and second bore seals 108, 110.

Valve assemblies of the present disclosure offer several advantages. Pilot operated valves are commonly used in place of direct operated valves in applications requiring greater valve member axial displacement and/or valve volumetric flow rates, and can therefore have greater seat and valve member spacing and timing issues. By maintaining an equal/adjustable spacing between first and second valve elements 76, 78 with respect to seating surfaces of valve assembly 15, and maintaining an equal surface area of contact between the first and second valve elements 76, 78 with respect to the seating surfaces in both first and second stop positions of valve assembly 15, each of first and second valve elements 76, 78 will simultaneously contact a respective seat surface with equal force and result in equal wear of the first and second valve elements 76, 78 and valve seats. This allows the sliding friction of first and second pistons 100, 102 to be minimized by use of only a single seal element in each piston, while using a pressurized fluid such as pressurized air to rapidly shuttle the valve member 36 between first and second stop positions.

By further use of conical-shaped seat surfaces throughout which are substantially parallel with the sealing surfaces of first and second valve elements 76, 78, each of the first and second valve elements wears at an equivalent rate and makes adjustment of valve timing easier and more consistent than with valve assemblies having differently shaped valve element surfaces and/or seat surfaces. In addition, use of two conical-shaped seat surfaces simultaneously contacted by two conical-shaped valve elements 76, 78 further maintains a repeatable valve closed position with substantially equal contact force and area of the valve elements 76, 78 with their respective seats. "Repeatable" as used herein is defined as substantially equal seating forces and surface areas being maintained as the valve elements 76, 78 wear with use. Conical shaped seat and valve elements of the present disclosure further reduce or prevent cutting action wear of the valve elements as the valve is repetitively activated which is associated with known sharp cornered seats and caused by the sealing material being repetitively deformed and ultimately damaged, for example by being cut as the valve member moves to its seated position against the square cut valve seat during each and every valve closing event.

The present disclosure is also not limited to the use of resilient and/or overmolded material for the valve elements 76, 78. These elements can also be made of metal or other non-resilient material, including being machined or formed of the same material of the valve member 36, having their conical shaped surfaces substantially matching the angle or orientation of the associated seat surfaces to provided simultaneous contact of the two valve elements with the conical-shaped seats.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A valve assembly, comprising:
    a valve body having a valve bore;
    a valve member slidably disposed within the valve bore between first and second stop positions;
    first and second radially extending valve elements connected to the valve member having first and second sealing surfaces oriented at equal angles with respect to a longitudinal axis of the valve member;
    the first and second sealing surfaces being oriented substantially parallel with conical shaped first and second seat surfaces positioned in the valve body, both first and second seat surfaces oriented at equal angles with respect to the longitudinal axis and having an adjustable spacing such that the first sealing surface contacts the first seat surface and the second sealing surface contacts the second seat surface simultaneously in the valve member first stop position; and
    first and second pistons positioned at opposite ends of the valve member each having only a single bore seal in each of the first and second pistons adapted to create a sliding seal.

2. The valve assembly of claim 1, wherein the first valve element includes a third sealing surface and the second valve element includes a fourth sealing surface, the third and fourth sealing surfaces defining mirror image orientations with respect to the first and second sealing surfaces, the third and fourth sealing surfaces oriented parallel to each other and each oriented at substantially equal angles with respect to the longitudinal axis of the valve member.

3. The valve assembly of claim 2, further including conical shaped third and fourth seat surfaces each adapted to be contacted by one of the third and fourth sealing surfaces, both third and fourth seat surfaces oriented at equal angles with respect to the longitudinal axis and oriented parallel to the third and fourth sealing surfaces of the valve elements such that the third sealing surface contacts the third seat surface simultaneously with the fourth sealing surface contacting the fourth seat surface in a second stop position of the valve member.

4. The valve assembly of claim 1, further including:
    a solenoid assembly connected to the valve body and adapted to communicate with pressurized air; and a solenoid member slidably positioned in the solenoid assembly adapted to change flow alignment of selected ones of first, second, and third ports of the solenoid assembly to direct the pressurized air to either the first or second piston to axially translate the valve member toward the first stop position or oppositely toward a second stop position of the valve member.

5. The valve assembly of claim 1, further including first and second adapters each selectively co-axially positioned with respect to the longitudinal axis and each including one of the first and second seat surfaces.

6. The valve assembly of claim 1, wherein the first and second valve elements are over-moldings of a resilient material molded onto the valve member, the first valve element adapted to seal against the first seat surface defining a first perimeter contact surface area and the second valve element adapted to seal against the second seat surface creating a second perimeter contact surface area equal to the first perimeter contact surface area.

7. The valve assembly of claim 1, wherein the valve body further includes a fluid inlet port in fluid communication with a source of fluid, first and second outlet ports, and first and second exhaust ports, wherein the first and second outlet ports communicate with the inlet port via the valve bore such that the inlet port is in fluid communication with the first outlet port in the first stop position of the valve member and the inlet port is in fluid communication with the second outlet port in a second stop position of the valve member.

8. The valve assembly of claim 1, wherein a surface area of the first valve element in contact with the first seat surface is substantially equal to a surface area of the second valve element in contact with the second seat surface in the first stop position.

9. A valve assembly, comprising:
a valve body having an axially extending valve bore;
a valve member slidably disposed within the valve bore between first and second stop positions;
first and second resilient valve elements connected to the valve member, the first valve element having a first sealing surface and the second valve element having a second sealing surface, the first and second sealing surfaces oriented at equal angles with respect to a longitudinal axis of the valve member, the first valve element further including a third sealing surface and the second valve element further including a fourth sealing surface;
the first sealing surface adapted to contact a conical shaped first seat surface defining a first perimeter contact surface area, and the second sealing surface adapted to contact a conical shaped second seat surface defining a second perimeter contact surface area equal to the first perimeter contact surface area, the first and second seat surfaces oriented substantially parallel to the first and second sealing surfaces, a spacing between the first and second seat surfaces being equal to a spacing between the first and second sealing surfaces providing for simultaneous contact between the first sealing surface and the first seat surface and between the second sealing surface and the second seat surface in the first stop position;
third and fourth seat surfaces oriented parallel to each other and oriented at substantially equal angles with respect to the longitudinal axis of the valve member;
an equal surface area of contact created between the first and second resilient valve elements with respect to the seat surfaces in both the first and second stop positions; and
first and second pistons positioned at opposite ends of the valve member each having a bore seal member and a resilient material centering bore seal having a conical tipped perimeter portion, the perimeter portion contacting first and second cylinder walls to center the first and second pistons with respect to a longitudinal axis of the valve member.

10. The valve assembly of claim 9, wherein the third and fourth sealing surfaces define mirror image orientations with respect to the first and second sealing surfaces.

11. The valve assembly of claim 10, wherein the third and fourth seat surfaces have a spacing equal to a spacing between the third and fourth sealing surfaces.

12. The valve assembly of claim 10, wherein the third and fourth seat surfaces are conical shaped and are each adapted to be contacted by one of the third or fourth sealing surfaces, both third and fourth seat surfaces oriented parallel to the third and fourth sealing surfaces providing simultaneous contact between the third sealing surface and the third seat surface and between the fourth sealing surface and the fourth seat surface when the valve member is positioned in the second stop position.

13. The valve assembly of claim 10, wherein the third sealing surface is adapted to contact the third seat surface defining a third perimeter contact surface area, and the fourth sealing surface is adapted to contact the fourth seat surface defining a fourth perimeter contact surface area equal to the third perimeter contact surface area.

14. The valve assembly of claim 9, further including at least one adapter slidably positioned within the valve bore between the valve member and the valve body and adapted to slidably receive the valve member, the at least one adapter axially movable to adjust a spacing between the first seat surface and the second seat surface.

15. The valve assembly of claim 9, wherein the valve body further includes an inlet port and first and second outlet ports, and wherein in the first stop position the valve member is adapted to selectively direct flow of a fluid from the inlet port through the valve bore to the first outlet port, and in a second stop position the valve member is adapted to selectively direct flow of the fluid from the inlet port through the valve bore to the second outlet port.

* * * * *